United States Patent [19]
Ueda et al.

[11] 3,881,147
[45] Apr. 29, 1975

[54] METHOD FOR PROTECTING THYRISTORS OF A CONVERTER AND SYSTEM THEREFOR

[75] Inventors: Akiteru Ueda; Hisao Amano; Naoe Kawakami, all of Hitachi-shi, Japan

[73] Assignee: Hitachi, Ltd., Tokyo, Japan

[22] Filed: Jan. 2, 1970

[21] Appl. No.: 474

[30] Foreign Application Priority Data
Jan. 8, 1969 Japan.................................. 44-1292

[52] U.S. Cl..................... 321/13; 321/38; 315/349
[51] Int. Cl. ............................................. H02h 7/14
[58] Field of Search ............................... 321/11–13, 321/38; 315/252, 268, 349, 148; 307/252, 54

[56] References Cited
UNITED STATES PATENTS
2,774,012  12/1956  Lamm et al........................ 315/148
3,474,321  10/1969  Ainsworth........................ 321/38 X FOREIGN PATENTS OR APPLICATIONS
180,681  10/1966  U.S.S.R................................ 321/12

OTHER PUBLICATIONS
IEEE Transactions on Power Apparatus and Systems, "A Method to Detect the Deionization Margin Angle and to Prevent the Commutation Failure of an Inverter for DC Transmission," Vol. PAS-86, No. 3, pp. 259–262.

Primary Examiner—William H. Beha, Jr.
Attorney, Agent, or Firm—Craig & Antonelli

[57]         ABSTRACT
In order to prevent the damage of thyristors in a converter such as an inverter or chopper due to deviations of their characteristics, margin angles of commutation in respective arms of the converter are detected and compared with a predetermined value. If a margin angle is smaller than the predetermined value, all thyristors of the arm are fired to fail in commutation and are thus protected from excess current or voltage.

20 Claims, 29 Drawing Figures

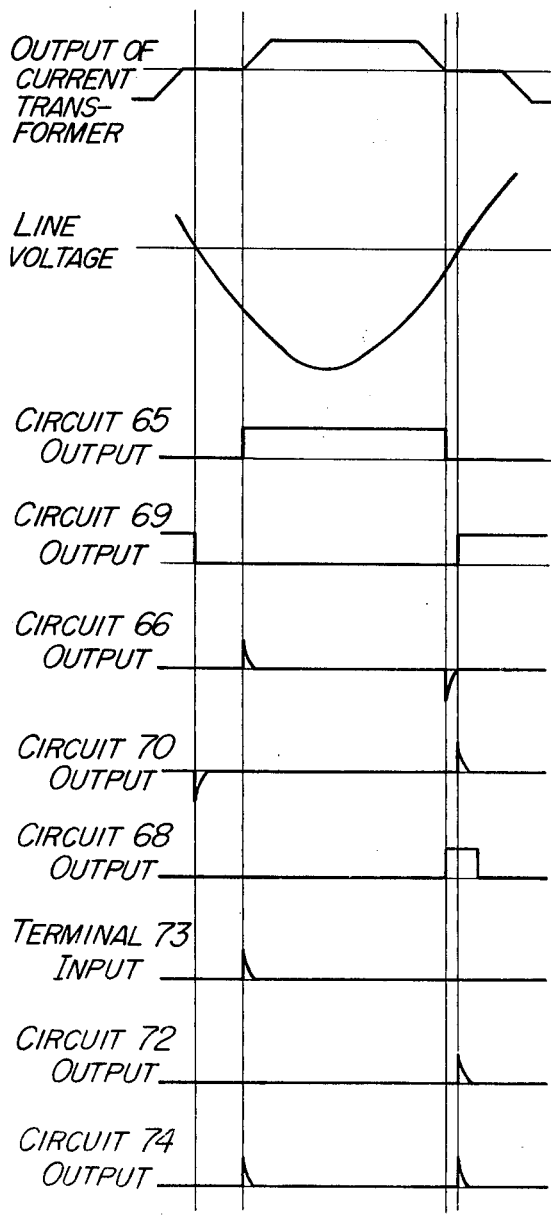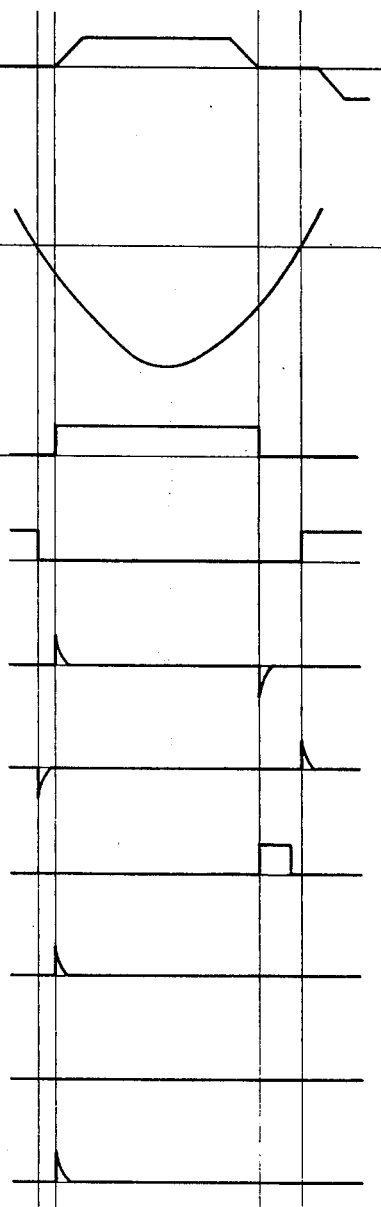

FIG. 9a ARM CURRENT 
FIG. 9b VOLTAGE ACROSS ARM 34 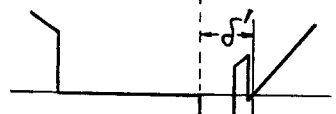
FIG. 9c FIRING PULSE WITH PHASE OF LAG OF 180° 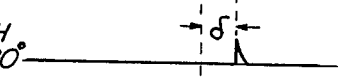
FIG. 9d CIRCUIT 65 OUTPUT 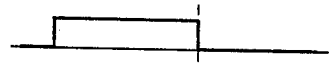
FIG. 9e CIRCUIT 66 OUTPUT 
FIG. 9f CIRCUIT 68 OUTPUT 
FIG. 9g CIRCUIT 72 OUTPUT 
FIG. 9h CIRCUIT 74 OUTPUT 
FIG. 10
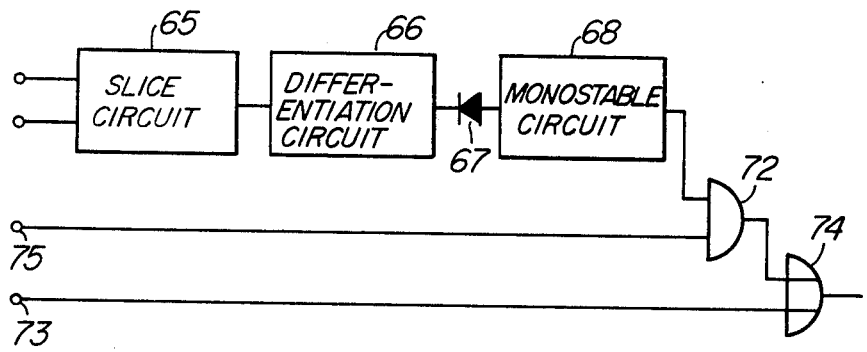

METHOD FOR PROTECTING THYRISTORS OF A CONVERTER AND SYSTEM THEREFOR

This invention relates to the protection of thyristors in a converter.

Recently, great progress has been made in semiconductor controlled rectifier elements (hereinafter referred to as thyristors). Converters, such as rectifiers, inverters and choppers, which comprise mercury-arc rectifiers are now being replaced with those comprising thyristors which are superior to mercury-arc rectifiers in many respects. However, as for the breakdown voltage, thyristors are far inferior to mercury-arc rectifiers.

Accordingly, even in the case of forming a converter which can be formed of one mercury-arc rectifier, it is often necessary to use several tens to several hundreds of thyristors in series. It cannot be expected that such a large number of thyristors and their control circuits, such as gate circuits, which accompany them can have uniform characteristics. Among the deviations of the characteristics of thyristors, deviations of the turn-on and turn-off characteristics become problems and modifications of the circuit are conventionally made to meet such problems.

However, in a converter, such as an inverter or chopper, it often occurs that after thyristors are turned off by the application of a reverse voltage, a forward voltage is again applied to the thyristors with a very short interval after the application of the reverse voltage. If this interval is too short, some of the series-connected thyristors are turned off but the others cannot be turned off. Such a case cannot be avoided only by the modification of circuit since converters, such as inverters and choppers, are operated in various manners and thyristors used in such converters inevitably have deviations in their characteristics.

When a voltage is applied to series-connected thyristors some of which are turned off and the others of which remain in the on state, the whole voltage is applied only to the turned-off thyristors and may cause their breakdown if the voltage applied per one turned-off thyristor is too large.

Occurrence of a state in which some of the series-connected thyristors are turned off and the others of which are still turned on cannot be avoided by any modification of circuit structure and thereby causes damage to the thyristors. Thus, some protection system which is stable in operation and economical in cost is needed for eliminating such danger of damage.

Further, since the current capacity of one thyristor is limited, a number of parallelly connected thyristors are necessary for allowing a large current to flow. In such cases, there also arise problems of deviations in the turn-off characteristic. Namely, when a reverse voltage is applied to thyristors through which current is flowing, the thyristors are naturally turned off. However, if the time interval for applying a reverse voltage is very short and a forward voltage is soon re-applied, those thyristors which have relatively long turn-off times are again turned on. Through those turned-on thyristors, the whole current is allowed to flow. Apparently, it will result in excess current for those turned-on thyristors.

In short, deviations in the turn-off characteristic cause excess voltage in a series connection and excess current in a parallel connection and in both cases lead to thyristor damage.

Accordingly, an object of the invention is to provide protection for the thyristors which can reliably prevent damage to the thyristors due to deviations in the turn-off characteristics of a number of thyristors.

Another object of the invention is to provide a thyristor protection system which can foresee an abnormal state to be caused by the deviations in the characteristics of thyristors and carry out the protection of thyristors.

A further object of the invention is to provide a thyristor protection system which is simple to manufacture and economical in cost.

The problem that only a part of the thyristors are turned off and the rest cannot be turned off concerns commutation and occurs when the margin angle (margin time) of commutation is insufficiently small. Namely, if the turn-off time of a thyristor is longer than margin angle, the thyristor cannot be turned off.

In a converter formed of one mercury-arc rectifier or thyristor, if the margin angle becomes transitionally too small, the mercury-arc rectifier or thyristor is naturally not turned off and causes commutation failure. A commutation failure is not preferable from the standpoint of the function of a converter and an excess current flows transitionally. But a commutation failure never breaks down a mercury-arc rectifier or thyristor.

This invention utilizes this fact. Namely, when a margin angle of commutation is smaller than a predetermined value, all the thyristors are fired to intentionally fail in commutation upon application of a forward voltage.

Other features and advantages of the invention will become apparent that description proceeds in connection with the accompanying drawings in which:

FIGS. 8a to 8b show waveforms for illustrating the operation of the embodiment of FIG. 6;

FIGS. 9a to 9h show waveforms at various positions of the circuit of FIG. 10; and FIG. 10 is a block diagram illustrating the main part of yet another embodiment of the invention.

First, the relation between the turn-off time and the margin angle of commutation (which is usually expressed in the terms of an electrical angle, taking the frequency of the a.c. circuit of a converter such as inverters or choppers as a standard, and called margin angle of commutation or simply margin angle) of a thyristor will be discussed with reference to FIGS. 1a to 1d.

Figure 1A:
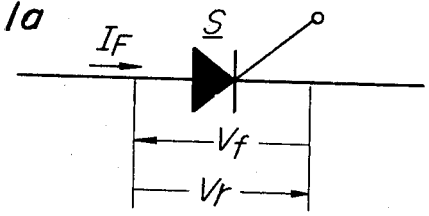
FIGS. 1a to 1d are schematic diagrams for illustrating the turn-off of a thyristor.
Figure 1B:
Figure 1C:
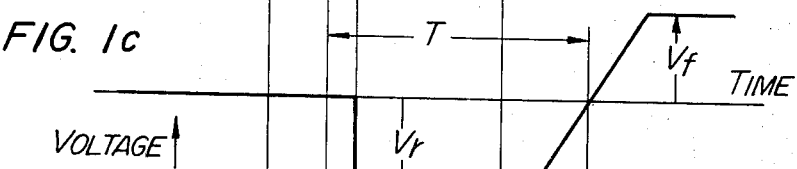

Suppose now that a forward current $I_F$ flows through a thyristor S and a reverse voltage $V_r$ is applied at time $t_1$ as is shown in FIG. 1a. Then, the current gradually decreases at a constant rate determined by the various factors of the circuit and reaches the value of zero at time $t_2$, but further decreases to negative values till a time of $t_3$ by the carrier storage effect and then returns to zero, as is shown in FIG. 1b. Upon realization of this state, reverse voltage $V_r$ appears across the thyristor S for the first time. When the circuit is switched in this state at time $t_6$ so as to apply a forward voltage $V_f$ to the thyristor S, the reverse voltage $V_r$ gradually decreases at a constant rate determined by the various factors of the circuit and reaches the value of zero at time $t_7$, as is shown in FIG. 1c, and a forward voltage gradually increases at the same rate to the value of $V_f$. The time interval between the time $t_2$ when current becomes zero and the time $t_7$ when the forward voltage begins to be applied is called the margin angle of commutation for such a circuit structure and under such conditions.

A thyristor cannot be turned off till a certain time period elapses after the time $t_2$ when the forward current becomes zero and if a forward voltage is applied before this certain time period elapses, the thyristor is again turned on even without an application of a firing pulse. Thus, there is a minimum time period to apply a reverse voltage for gradually turning off a thyristor and this time period is called the turn-off time (indicated by $T_o$).

Figure 1D:
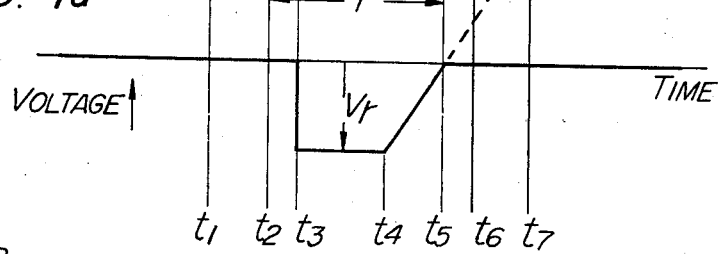

Thus, if a margin angle of commutation T is smaller than the turn-off time $T_o$, the thyristor cannot be turned off. This principle is illustrated in FIG. 1d in which the reverse voltage begins to decrease at time $t_4$ and a forward voltage appears at time $t_5$, thereby the margin angle being T' from the time $t_2$ to the time $t_5$. Provided that T' < $T_o$, a forward current is allowed to flow from the time $t_5$ as is indicated by the dotted line in FIG. 1b. Thus, the thyristor is not turned off and does not impose any part of the forward voltage.

As is described above, if the margin angle is not greater than the turn-off time, a thyristor could fail in commutation and a converter such as an inverter or chopper cannot operate normally. Thus, a converter is so arranged that the margin angle of the firing phase of the thyristor should be always larger than the turn-off time. But the manner of operation of a converter such as an inverter or chopper is varied very widely and an unexpected accident such as short-circuiting of the a.c. circuit may occur, so that it is very difficult in practice to realize a circuit structure and a protection system which can eliminate a commutation failure completely.

Figure 2:
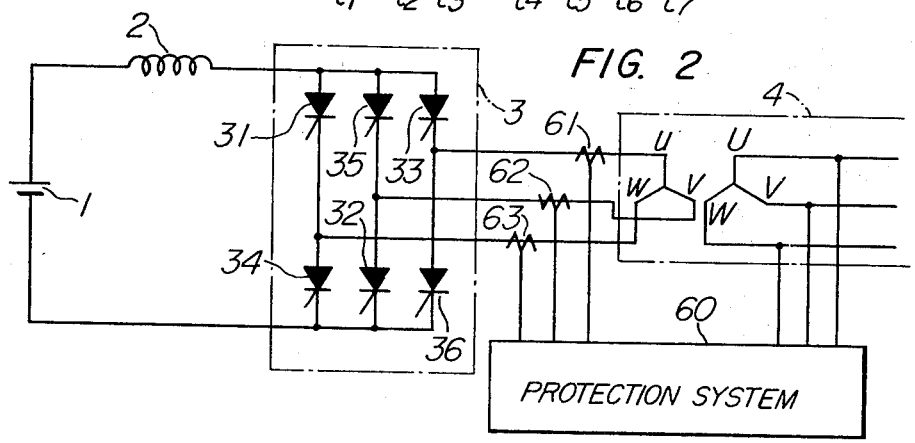
FIG. 2 is a block diagram showing the network of a d.c. transmission system including inverters.
Figure 3:
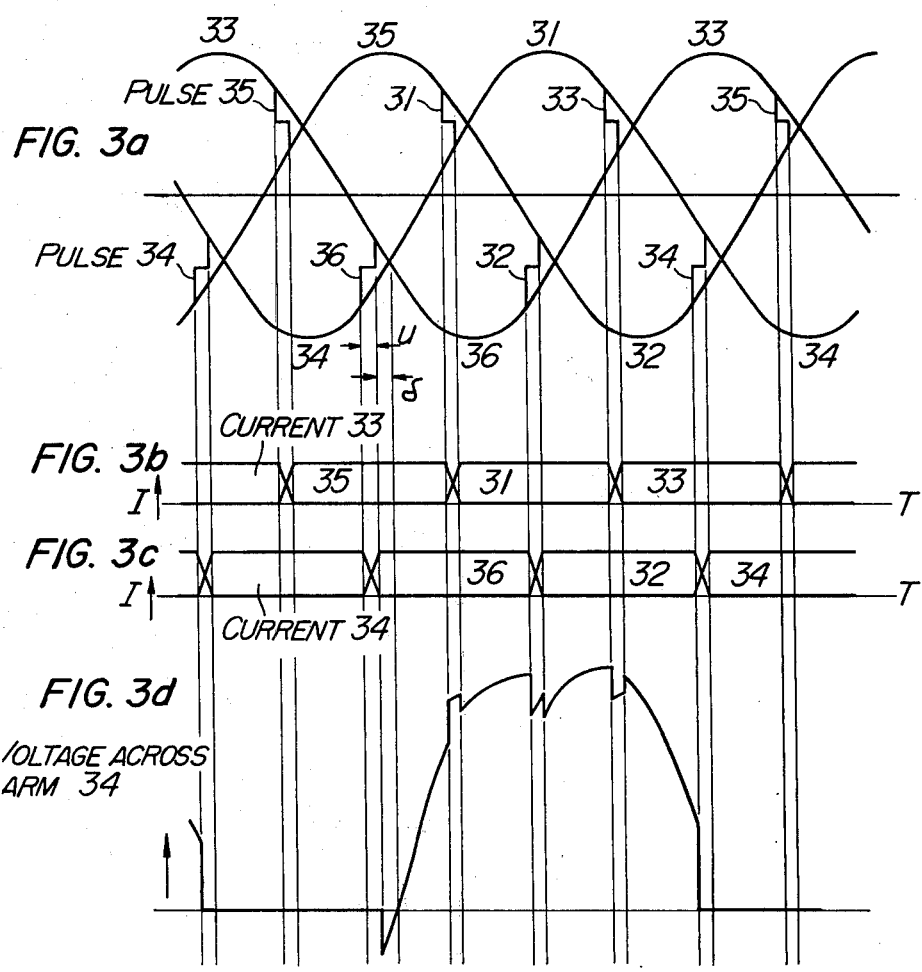
FIGS. 3a to 3d show waveforms for illustrating the operation of an inverter of the system of FIG. 2.

Further, there are inherent deviations in the turn-off time of thyristors and further the turn-off time also varies depending on the current flowing through the thyristor, the temperature of the junction surface of the thyristor element, etc. Therefore, if a commutation failure occurs in a converter such as an inverter or chopper which is formed of a number of series- and/or parallelly connected thyristors, some thyristors are turned off while others can not be turned off, resulting in the possibility of damage to the thyristors. This will be described in more detail referring to FIG. 2 in which an equivalent circuit of a d.c. transmission system is shown. The system comprises a d.c. source 1 formed of a rectifier, a d.c. reactor 2 including a d.c. transmission line, an inverter 3 and an a.c. circuit 4. A d.c. current from the rectifier 1 is commutated into an a.c. current through the inverter 3 and sent to the a.c. circuit 4. The inverter 3 is formed of a graetz connection of thyristor arms 31 to 36 which are respectively formed of a number of series-connected thyristors. FIGS. 3a to 3d show the manner of operation of this inverter 3. FIG. 3a shows the order of a firing pulse, superposed angle, and margin angles of the thyristors of respective arms. Curves indicated by numerals 31 to 36 represent phase voltages of the arms 31 to 36 respectively. For the proper operation of the inverter 3, the thyristors should be fired in the order of 31, 33, 35, 31, ... on the upper side and 32, 34, 36, 32, ... on the lower side. When thyristors are controlled in the manner of FIG. 3a, current is allowed to flow through the respective arms as is shown in FIGS. 3b and 3c. Taking the commutation from the arm 34 to the arm 36 as an example, a firing pulse is given to the arm 36 while the current in the arm 34 is still flowing. Then the currents in the arms 34 and 36 both flowed for a period of the lapped angle $\mu$. At the end of the angle $\mu$, the arm 34 is cut off and the arm 36 solely permits current flow. During the period of current flow, the arm 34 bears no voltage and during the period of no current flow and no forward voltage, i.e., the period of the margin angle $\delta$, a reverse voltage is applied to the arm and after this a forward voltage is applied. FIG. 3d shows the voltage of a waveform applied to the arm 34. Here, if the margin angle $\delta$ is smaller than the turn-off time $T_o$ of the thyristor 34, current to be shifted to the arm 36 is again allowed to flow through the arm 34; this results in a commutation failure. Problems arise in the case of an arm formed of a number of series-connected thyristors when the arm itself has performed commutation, but some thyristors are still turned on. In such a case, the arm voltage as shown in FIG. 3d is applied only to the turned-off thyristors, which are thereby subjected to excess voltage.

For handling low voltage and large current, an inverter comprises arms, each of which comprises a number of parallelly connected thyristors. In this case if the margin angle of an arm is too short, those thyristors which have a turn-off time that is longer than the margin angle cannot be turned off and the arm fails in commutation. The current allowed to flow through this arm by the failure of commutation flows through only those thyristors which failed to turn off and cause the problem of excess current.

According to the invention, at the time when the margin angle of commutation has elapsed, this margin angle is compared with a predetermined value and if it is not greater than the predetermined value, a firing pulse is given to every thyristor of the arm to intentionally cause the failure of commutation in the arm. Thus, excess voltage or current is prevented from being applied to some of the thyristors.

Figure 4:
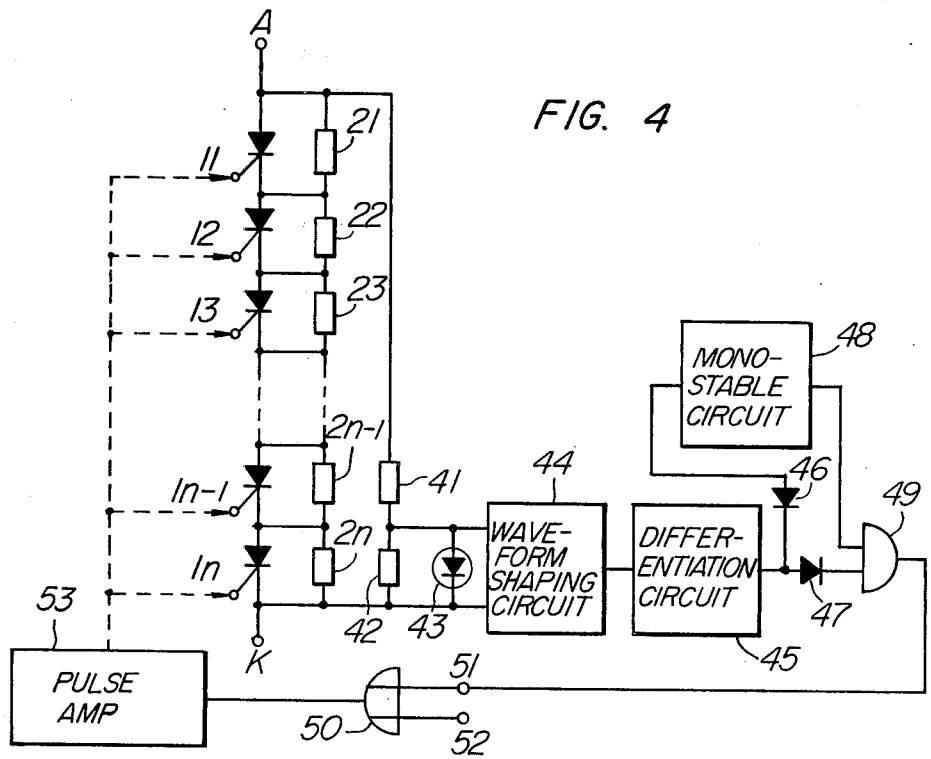
FIG. 4 is a block diagram of the network of an embodiment of the invention.

Now, the invention will be described with respect to several embodiments. FIG. 4 shows a block diagram of an embodiment comprising series-connected thyristors 11, 12, ..., 1n between terminals A and K. This circuitry between terminals A and K corresponds to one of the arms 31 to 36 of FIG. 2. Voltage dividers 21, 22, ..., 2n are connected in series and respectively in parallel to the thyristors 11 to 1n for uniformalizing the voltages applied to the respective thyristors. Voltage dividers 41 and 42 are connected between terminals A and K to detect the voltage applied between these terminals. A Zener diode 43 is connected across the voltage divider 42 for limiting the maximum input voltage of a waveform shaping circuit 44 which, for example, supplies an output of a constant positive voltage when the input is positive and an output of no voltage when the input is negative. The output of the waveform shaping circuit 44 is supplied to a differentiation circuit 45 which generates a positive and a negative pulse upon building up and falling down of the input voltage, respectively. Diodes 46 and 47 are connected to the differentiation circuit to selectively derive negative and positive pulses, respectively. A monostable circuit 48 connected to the diode 46 is triggered by a negative pulse from the diode 46 and generates an output for a certain period which is set to be equal to the minimum time length for applying a reverse voltage between terminals A and K to stably turn off every thyristor. The outputs of the diode 47 and the circuit 48 are sent to an AND circuit 49 which allows a positive pulse from the diode 47 to pass through when the circuit 48 also gives an output. The output of the AND circuit 49 is sent through a terminal 51 to an OR circuit 50 which receives a firing pulse from a phase control circuit (not shown) through another terminal 52. A pulse amplifier 53 receives the output of the OR circuit 52 and sends it to the thyristors 11 to 1n after amplification to fire them. Thus the thyristors 11 to 1n are normally fired by the firing pulse from the terminal 52 to function as an inverter and are also fired by the pulse from the terminal 51 when the time interval from the occurrence of a negative pulse to the occurrence of the following positive pulse in the differentiation circuit 45 is not longer than the period of energization of the mono-stable circuit 48, i.e., when the margin angle is not longer than the turn-off time. A positive pulse from the terminal 51 indicates a possibility that some thyristors are turned off but other thyristors are not turned off, i.e., the possibility of the excess voltage for some of the thyristors. Under such circumstances, all the thyristors are given a firing pulse to turn on to intentionally fail in commutation. Therefore, the function of an inverter is not carried out, but damage to the thyristors is prefectly prevented.

Figure 5A:
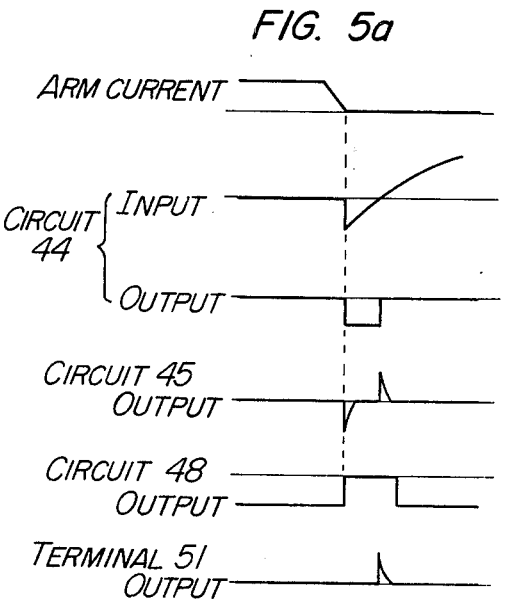
FIGS. 5a to 5b show waveforms for illustrating the operation of the circuit of FIG. 4.
Figure 5B:
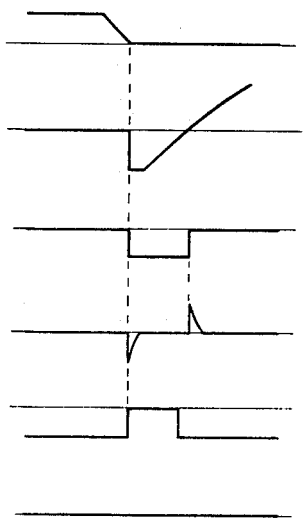

FIGS. 5a and 5b show the manner of operation of the circuit of FIG. 4 and more specifically FIG. 5a shows a case in which the margin angle is not long enough and FIG. 5b shows a case of normal operation. In FIG. 5a, after the arm current falls down to zero, thyristors are imposed with a reverse voltage by which the circuit 45 generates a negative pulse. Then the thyristors are imposed with a forward voltage and the circuit 45 generates a positive pulse. The negative pulse activates the mono-stable circuit 48 to give an output for a predetermined period corresponding to the turn-off time. If a positive pulse is generated within the energization of the circuit 48 as is shown in FIG. 5a, the positive pulse is sent to the thyristors to fire them. Thus, the circuit is forced to fail in commutation and the thyristors are protected from damage. If the time period for generating output in the circuit 48 is made longer, more certainly are the thyristors protected. But if it is made too long, the operation of an inverter is uselessly affected. Therefore, this time period is selected to be long enough the effectively protect thyristors but short enough so as not to do harm to the function of an inverter. In FIG. 5b, a positive pulse is generated when a sufficient time has elapsed after a negative pulse and thus no pulse is sent to the terminal 51. The reverse voltage at the input of the circuit 44 does not get larger than a certain value because of the existence of the Zener diode 43 before the circuit 44.

Figure 11:
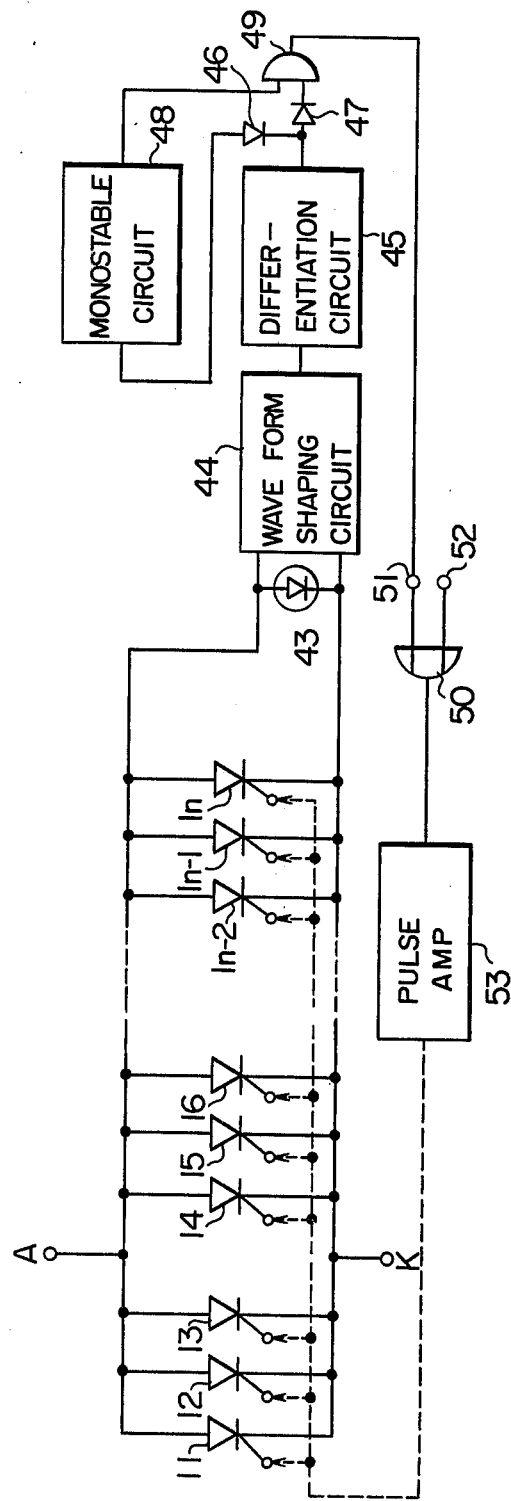
FIG. 11 is a block diagram of the network of an embodiment of the invention, similar to FIG. 4, but with parallel-connected thyristors.

In place of series-connected thyristors 11, 12, ... 1n as shown in FIG. 4, the thyristors may be connected in parallel as shown in FIG. 11. The remaining portion of the circuit is the same as that shown in FIG. 4, so that a detailed description thereof is unnecessary.

In the embodiment described above, a detection circuit is provided to each arm of an inverter. Now, an embodiment in which input is derived from the a.c. circuit portion of a converter will be described. FIG. 2 schematically shows the interconnection of this embodiment with the outer circuit. In FIG. 2, a protection system 60 receives inputs from current transformers 61, 62 and 63 to derive phase currents and also from a.c. lines of a voltage transformer to derive line voltages. The protection system 60 is partially shown in FIG. 6 in more detail. The circuit of FIG. 6 constitutes the portion for one arm and in the whole system, a similar circuit is provided for each arm. Before explaining the circuit of FIG. 6, the relation between the current signals from the current transformers 61, 62 and 63 and the line voltages from the a.c. circuit will be described referring to FIGS. 7a to 7d. FIGS. 7a to 7c are the same as FIGS. 3a to 3c and illustrate the order of firing of the respective arms. Supposing a current flowing from the inverter 3 to the a.c. circuit 4 is positive in FIG. 2, waveforms as shown in FIG. 7d are detected at the current transformers 61 to 63. Regarding the commutation from the arm 35 to the arm 31, the current through the transformer 62 drops from positive to zero upon commutation. The commutation voltage (line voltage) contributing to this commutation is indicated by a dotted line $V_{vu}$ which works as a reverse voltage to the arm 35 at the time of commutation and becomes a forward voltage after the margin angle δ. Thus the margin angle can be monitored by detecting the relation of the output of the current transformer 62 and the line voltage $V_{vu}$. Accordingly, when the margin angle is smaller than a predetermined value, the arm 35 is fired immediately after the line voltage becomes positive, obtaining the same protective effect as that of the first embodiment (FIG. 4). As for the other arms, similar protection systems and arrangements are provided to the respective arms.

Figure 6:
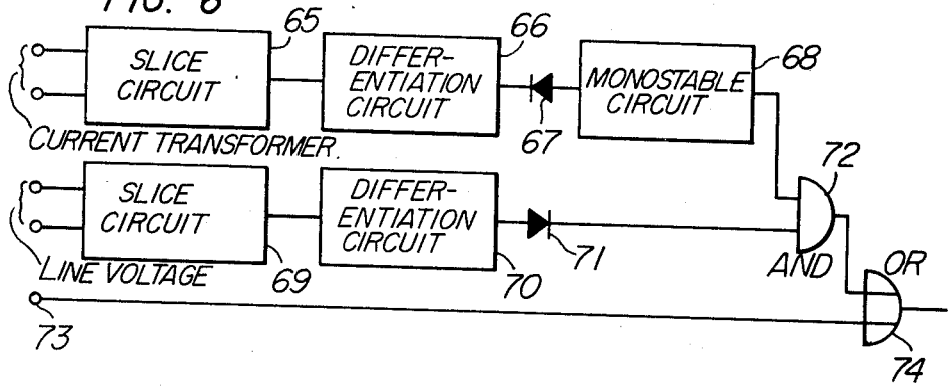
FIG. 6 is a block diagram showing the main part of another embodiment of the invention.
Figure 7A:
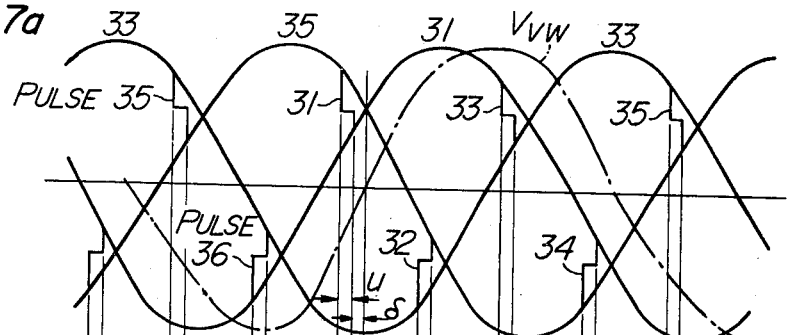
FIGS. 7a to 7d show waveforms for illustrating the manner of operation of the circuit of FIG. 2.
Figure 7B:
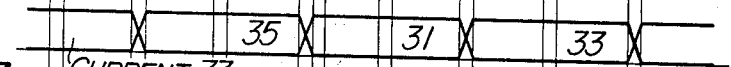
Figure 7C:
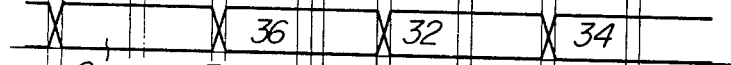
Figure 7D:
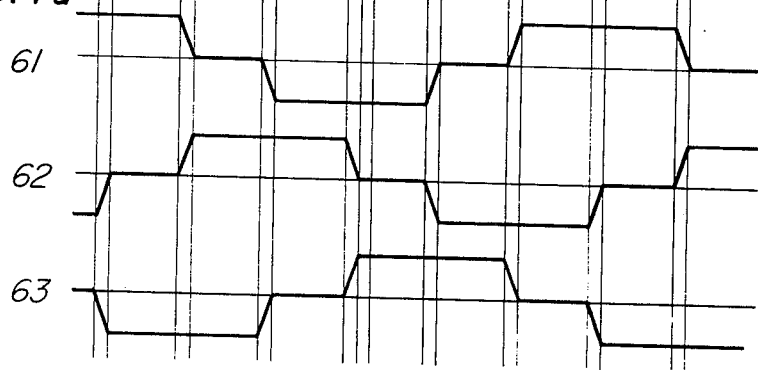

The circuit of FIG. 6 is based on such an idea and FIGS. 8a and 8b illustrate the manner of operation of this circuit. FIG. 8a shows a case of insufficient margin angle and FIG. 8b a case of sufficient margin angle. In FIG. 6, a protection unit comprises a slice circuit 65 connected to the output of a current transformer, a slice circuit 69 connected to a corresponding line voltage, both of which generate an output when the input signal is positive, differentiation circuits 66 and 70 connected to the slice circuits 65 and 69, respectively, which gives a positive pulse upon building up of an input signal and a negative pulse upon dropping of an input signal, diodes 67 and 71 connected to circuits 66 and 70 and allowing only negative and positive pulse, respectively, a monostable circuit 68 connected to the diode 67 and giving an output for a predetermined time period upon triggering by a negative pulse, an AND circuit 72 connected to the monostable circuit 68 and the diode 71, and an OR circuit 74 connected to the AND circuit 72 and a terminal 73 for introducing a controlled firing pulse. The AND circuit 72 transmits a positive pulse from the diode 71 when the mono-stable circuit 68 also gives an output. The OR circuit 74 transmits either signal from the AND circuit 72 and the terminal 73. The output of the OR circuit is sent to the thyristors through a pulse amplifier (not shown) to fire them.

When the margin angle δ is sufficiently large, the thyristors are fired only by the normal firing pulses from the terminal 73, as is shown in FIG. 8b. But if the margin angle δ is too small, the thyristors are also fired by the output pulse of the AND circuit 72, thus avoiding any damage to the thyristors.

As is well known, when the control angle $\gamma(\gamma = \mu + \delta)$ exceeds 60° (electrical angle), the voltage imposed to the arm is suddenly shifted from negative to positive by the influence of the lapped angle of the phase current to be commutated which has an angle of lag of 60° with respect to said arm at the time of commutation. This is illustrated in FIGS. 9a and 9b. In such a case, the margin angle δ practically becomes smaller as is shown in FIG. 9b. When such decreased margin angle is smaller than a predetermined value, thyristors should also be fired in order to protect them. In the case of the circuit of FIG. 4, the arm voltage itself is monitored, therefore there is no need for further protection means in principle. But in the case of the circuit of FIG. 6, inputs of the protection system are derived from a line voltage (commutation voltage) so that some measures should be taken to meet the above situation. Namely, in this line voltage, such influence of the commutation does not appear and the margin angle is detected as δ' indicated in FIG. 9b. Therefore, some complementary means should be provided as well as the protection system as shown in FIG. 6 to fire the thyristors even in the case of FIGS. 9a and 9b.

FIG. 10 shows an embodiment of such complementary protection means. In FIG. 10, reference numerals 65 to 68 and 72 to 73 represent similar parts as in FIG. 6. A terminal 75 for receiving a pulse input is provided to supply a firing pulse with a phase of lag of 180°. Examples of the firing pulse with a phase of lag of 180° are, for example in FIG. 3a, pulse 32 with respect to pulse 35 and pulse 34 with respect to pulse 31. Therefore, in the protection circuit for the arm 35, pulse 35 is supplied to the terminal 73 and pulse 32 is supplied to the terminal 75. FIGS. 9b to 9h illustrate the manner of operation of this circuit for a case in which margin angle δ is extremely small. This situation is same as that of FIG. 8 except one of the inputs of the AND circuit 72 being changed to the terminal 75. Accordingly, the meaning of FIGS. 9b to 9h will be apparent. In short, the timing of the pulse application of 180° lag is monitored utilizing the firing pulse. Thus, in the case of protecting a converter utilizing the voltage or current of the a.c. circuit, a complete protection system is obtained by integrating the circuit structure of FIGS. 6 and 10. In the embodiment of FIG. 4 also, it is preferable to respond more rapidly to such a situation in which the arm voltage suddenly builds up as is shown in FIG. 9b so that the provision of the circuit of FIG. 10 apparently affords further protection for the thrystors. In this case, it is apparent that in place of the provision of circuits 65 to 68 the output of the monostable circuit 48 (FIG. 4) may be used in common.

In the foregoing, protection of series-connected thyristors is described, but parallelly connected thyristors can also be protected in the same manner. The difference lies only in the point that thyristors which have failed in turning off are protected from excess current in a parallel connection while those which have been turned off are protected from excess voltage in a series connection. In both cases, margin angles from the time when the arm current becomes zero to the time of application of a forward voltage are detected and if some of them are smaller than a predetermined value, every thyristor of those arms is triggered to be turned on. Thus, the circuits of FIGS. 4, 6 and 10 are also applicable to a case of parallel connection without any change.

Further, it will be apparent that the invention can be modified in various ways. For example, in the embodiment of FIG. 4, the voltage dividers 41 and 42 can be dispensed with and a voltage can be derived from a part of the voltage dividers 21 to 2n. In FIG. 2, current transformers 61 to 63 can be provided on the primary side of the voltage transformer. In FIG. 7, polarity of the phase circuit can be set in either way.

Therefore, it is to be noted that the description made above is not limitative and the invention should only be limited by the following claims.

What is claimed is:

1. A thyristor protection system for use in a converter, said converter comprising at least one arm which comprises a plurality of thyristors connected in series and/or parallel, and an a.c. circuit which includes a voltage transformer, said system comprising a first monostable circuit for receiving the phase control of the secondary side of the voltage transformer and for generating an output for a predetermined period of time upon triggering, said first monostable circuit being triggered when the phase current becomes zero, a differentiation circuit connected to the lines of the primary side of said voltage transformer for generating a pulse output when the line voltage becomes positive, and a first AND circuit connected to said first monostable circuit and said differentiation circuit for generating a pulse output when both of said circuits simultaneously give outputs, the pulse output of said first AND circuit being supplied to the thyristors to fire them.

2. A thyristor protection system according to claim 1, further comprising a second monostable circuit for receiving the phase current and for generating an output for a predetermined time upon triggering, said second monostable circuit being triggered when the phase current becomes zero, a terminal for introducing a firing pulse having a lag angle of 180° with respect to the firing pulse for the arm under protection, and a second AND circuit connected to said second monostable circuit and said terminal for generating an output when both of said second monostable circuit and said terminal simultaneously give outputs, the thyristors of the arm under protection being fired by either output of said first and second AND circuits.

3. A thyristor protection system according to claim 2, in which one of said first and second monostable circuits is further adapted to serve as the other circuit.

4. A thyristor protection system for use in a converter comprising arms, each arm including a plurality of thyristors connected in series and/or parallel, the system comprising a monostable circuit for receiving a phase current and for generating an output for a predetermined period of time upon triggering when said phase current becomes zero, a terminal for introducing a firing pulse having a lag angle of 180° with respect to the firing pulse for the arm under protection, and an AND circuit connected in said monostable circuit and said terminal for generating an output when both of said circuits simultaneously give outputs, the output of said AND circuit being sent to the thyristors of said arm to fire them.

5. A thyristor protection system for use in a converter which comprises arms including a plurality of thyristors connected in series and/or parallel, said system comprising a voltage divider for detecting the voltage applied to an arm, a waveform shaping circuit connected to said voltage divider for deriving the time period when the input voltage from said voltage divider is negative, a differentiation circuit for differentiating the output of said waveform shaping circuit to generate a positive and a negative pulse at the time of the increase and reduction of the input, respectively, a first monostable circuit connected to said differentiation circuit for generating an output for a predetermined period of time upon triggering by the first pulse of the circuit, and a first AND circuit connected to said first monostable circuit and said differentiation circuit for transmitting the second pulse from differentiation circuit when said first monostable circuit supplies its output, the second pulse transmitted through said first AND circuit being sent to the thyristors of the arm under protection to fire them, and further comprising a second monostable circuit for receiving a phase current and for generating an output for a period of time upon triggering when the phase current becomes zero, a terminal for introducing a firing pulse having a lag angle of 180° with respect to the firing pulse for the arm under protection, and a second AND circuit connected to said second monostable circuit and said terminal for generating an output when both said monostable circuit and terminal supply outputs simultaneously, the thyristors of said arm being fired by either output of said first and second AND circuits.

6. A thyristor protection system according to claim 5, in which said first monostable circuit is further adapted to serve as said second monostable circuit.

7. In a converter connected between a DC power line and a polyphase AC power line which comprises a plurality of arms corresponding to the phases of said AC power line and each having a plurality of thyristors connected together; a method for protecting said thyristors of each one of said arms comprising detecting the time when a forward current passed through said arm ceases to flow, producing a signal responding to a forward voltage when said forward voltage is imposed to said arm before a predetermined time interval elapses from said time, and firing said thyristors of said arm by said signal.

8. A method in accordance with claim 7, wherein said time when said arm current ceases to flow is detected from a corresponding phase current of said AC power line, and a forward voltage which is imposed to said arm is detected from a corresponding line voltage of said AC power line.

9. In a converter connected between a DC power line and a polyphase AC power line which comprises a plurality of arms corresponding to the phases of said AC power line and each having a plurality of thyristors connected together; a method for protecting said thyristors of each one of said arms comprising detecting the time when a reverse voltage appears across said arm, producing a signal responding to a forward voltage which appears across said arm before a predetermined time interval elapses from said time, and firing said thyristors of said arm by said signal.

10. In a converter connected between a DC power line and a polyphase AC power line which comprises a plurality of arms corresponding to the phases of said AC power line and each having a plurality of thyristors connected in series and/or parallel; a method for protecting said thyristors of each one of said arms comprising detecting the time when a current passed through said arm becomes zero, introducing a firing pulse which is used for firing the thyristors of another arm to be fired in lag by 180° electrically from said first-mentioned arm, and firing said thyristors of said first-mentioned arm by said firing pulse when said firing pulse appears before a predetermined time interval elapses from said time.

11. In a converter connected between a D.C. power line and a polyphase A.C. power line having a plurality of arms corresponding to the phases of said A.C. power line, each arm having a plurality of thyristors connected therein a method for protecting the thyristors in each one of said arms comprising the steps of:
    detecting the instant of time when the current through an arm becomes zero;
    generating a first signal, the duration of which extends between the instant of time when said current becomes zero and an instant of time subsequent thereto when a forward voltage may be applied across said arm without igniting one of said thyristors;
    generating a second signal, in response to the application of a forward voltage across the thyristors of said arm only during the duration of said first signal; and
    applying said second signal to said thyristors of said arm, whereby said thyristors within said arm are fired no later than said application of a forward voltage across said arm.

12. A thyristor protection system for use in a converter, said converter having at least one arm which includes a plurality of thyristors connected together and across an A.C. power line, said system comprising:
    first means, responsive to the current flow in one of said arms, for detecting when said current flow becomes zero;
    second means, responsive to said first means and to the output voltage across said one of said arms, for generating a first signal the duration of which extends between the instant when said current flow becomes zero and when said voltage becomes a forward voltage across said thyristors of said one of said arms;
    third means, responsive to said second means, for generating a thyristor firing signal, upon the duration of said first signal ending prior to the termination of a prescribed period of time after said current flow becomes zero; and
    fourth means, responsive to said third means, for applying said thyristor firing signal to be thyristors of said one of said arms.

13. A thyristor protection system for use in a converter comprising at least one arm having a plurality of thyristors connected in series, said system comprising:
    first means for producing a first output signal corresponding to a margin angle of commutation for said arm responsive to a reverse voltage applied to said arm,
    second means being rendered operative simultaneously with initiating of said first output signal to produce a second output signal during a predetermined reference time longer than the longest turn-off time for the thyristors of said arm, and third means for comparing said first and second output signals to produce a firing signal when said first output signal terminates in the presence of said second output signal, said firing signal being applied to said arm for firing the thyristors thereof whereby the thyristors of said arm are refired when the time at which said arm is impressed with a reverse voltage is shorter than a predetermined reference time.

14. A thyristor protection system for use in a converter which comprises arms including a plurality of thyristors connected in series and/or parallel, said system comprising a voltage divider for detecting the voltage applied to an arm, a waveform shaping circuit connected to said voltage divider for deriving the time period when the input voltage from said voltage divider is negative, a differentiation circuit for differentiating the output of said waveform shaping circuit to generate a positive and a negative pulse at the time of the increase and reduction of the input, respectively, a first monostable circuit connected to said differentiation circuit for generating an output for a predetermined period of time upon triggering by the first pulse of the differentiation circuit, and a comparing circuit connected to said first monostable circuit and said differentiation circuit for comparing the output of said first monostable circuit and the second pulse from said differentiation circuit to transmit the second pulse from said differentiation circuit to the thyristors of the arm under protection to fire them when said second pulse occurs in the presence of the output of said first monostable circuit, and further comprising a second monostable circuit for receiving a phase current and for generating an output for a period of time upon triggering when the phase current becomes zero, a terminal for introducing a firing pulse having a lag angle of 180° with respect to the firing pulse for the arm under protection, and an AND circuit connected to said second monostable circuit and said terminal for generating an output when both said monostable circuit and terminal supply outputs simultaneously, the thyristors of said arm being fired by either output of said AND circuit and said comparing circuit.

15. A thyristor protection system according to claim 14, in which said first monostable circuit is further adapted to serve as said second monostable circuit.

16. A thyristor protection system for use in a converter which comprises arms including a plurality of thyristors connected in series and/or parallel, said system comprising a voltage divider for detecting the voltage applied to an arm, a waveform shaping circuit connected to said voltage divider for deriving the time period when the input voltage from said voltage divider is negative, a first monostable circuit responsive to the output of said waveform shaping circuit to produce an output for a predetermined period of time from the occurrence of the output of said waveform shaping circuit, and a comparing circuit for comparing the output of said first monostable circuit and a first signal indicative of the expiration of the output of said waveform shaping circuit to produce a second signal when said first signal occurs in the presence of the output of said first monostable circuit, said second signal being supplied to the thyristors of the arm under protection to fire them, and further comprising a second monostable circuit for receiving a phase current and for generating an output for a period of time upon triggering when the phase current becomes zero, a terminal for introducing a firing pulse having a lag angle of 180° with respect to the firing pulse for the arm under protection, and an AND circuit connected to said second monostable circuit and said terminal for generating an output when both said monostable circuit and terminal supply outputs simultaneously, the thyristors of said arm being fired by either output of said AND circuit and said comparing circuit.

17. A thyristor protection system according to claim 16, in which said first monostable circuit is further adapted to serve as said second monostable circuit.

18. In a converter connected between a D.C. power line and a polyphase A.C. power line which comprises a plurality of arms corresponding to the phases of said A.C. power line and each having a plurality of thyristors connected together; a method for protecting said thyristors of each one of said arms comprising detecting the time when a forward current passed through said arm ceases to flow producing a signal responding to the expiration of a reverse voltage when said reverse voltage expires before a predetermined time interval elapses from said time, and firing said thyristors of said arm by said signal.

19. A method in accordance with claim 18, wherein said time when said arm current ceases to flow is detected from a corresponding phase current of said A.C. power line, and the expiration of a reverse voltage which has appeared across said arm is detected from a corresponding line voltage of said A.C. power line.

20. In a converter connected between a D.C. power line and a polyphase A.C. power line which comprises a plurality of arms corresponding to the phases of said A.C. power line and each having a plurality of thyristors connected together; a method for protecting said thyristors of each one of said arms comprising detecting the time when a reverse voltage appears across said arm, producing a signal responding to the expiration of said reverse voltage when said reverse voltage expires before a predetermined time interval elapses from said time, and firing said thyristors of said arm by said signal.

* * * * *